(No Model.) 3 Sheets—Sheet 1.

L. B. LANCASTER.
PLANTER.

No. 444,072. Patented Jan. 6, 1891.

Witnesses
Chapman Fowler
W. T. Miller

Inventor
Levi B. Lancaster,
by A. H. Evans & Co
Attorneys (No Model.) 3 Sheets—Sheet 2.

L. B. LANCASTER.
PLANTER.

No. 444,072. Patented Jan. 6, 1891.

Witnesses
Chapman Fowler
W. P. Miller

Inventor
Levi B. Lancaster
by A. H. Evans & Co.
Attorneys

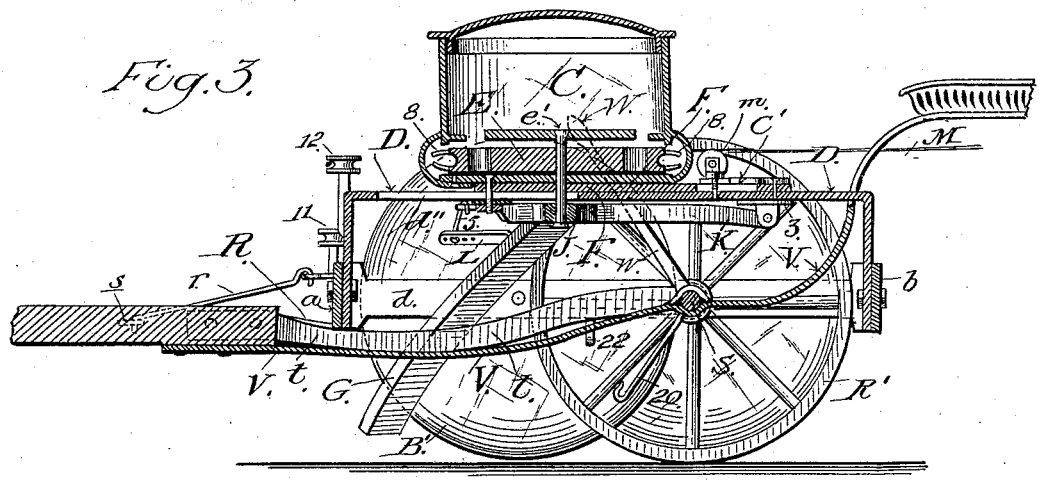

UNITED STATES PATENT OFFICE.

LEVI BENJAMIN LANCASTER, OF MASSILLON, IOWA.

PLANTER.

SPECIFICATION forming part of Letters Patent No. 444,072, dated January 6, 1891.

Application filed August 28, 1890. Serial No. 363,246. (No model.)

*To all whom it may concern:*

Be it known that I, LEVI B. LANCASTER, a citizen of the United States, residing at Massillon, in the county of Cedar and State of Iowa, have invented certain new and useful Improvements in Seeders and Planters, of which the following is a full and clear description, reference being had to the accompanying drawings, making a part of this specification, in which—

Figure 1:
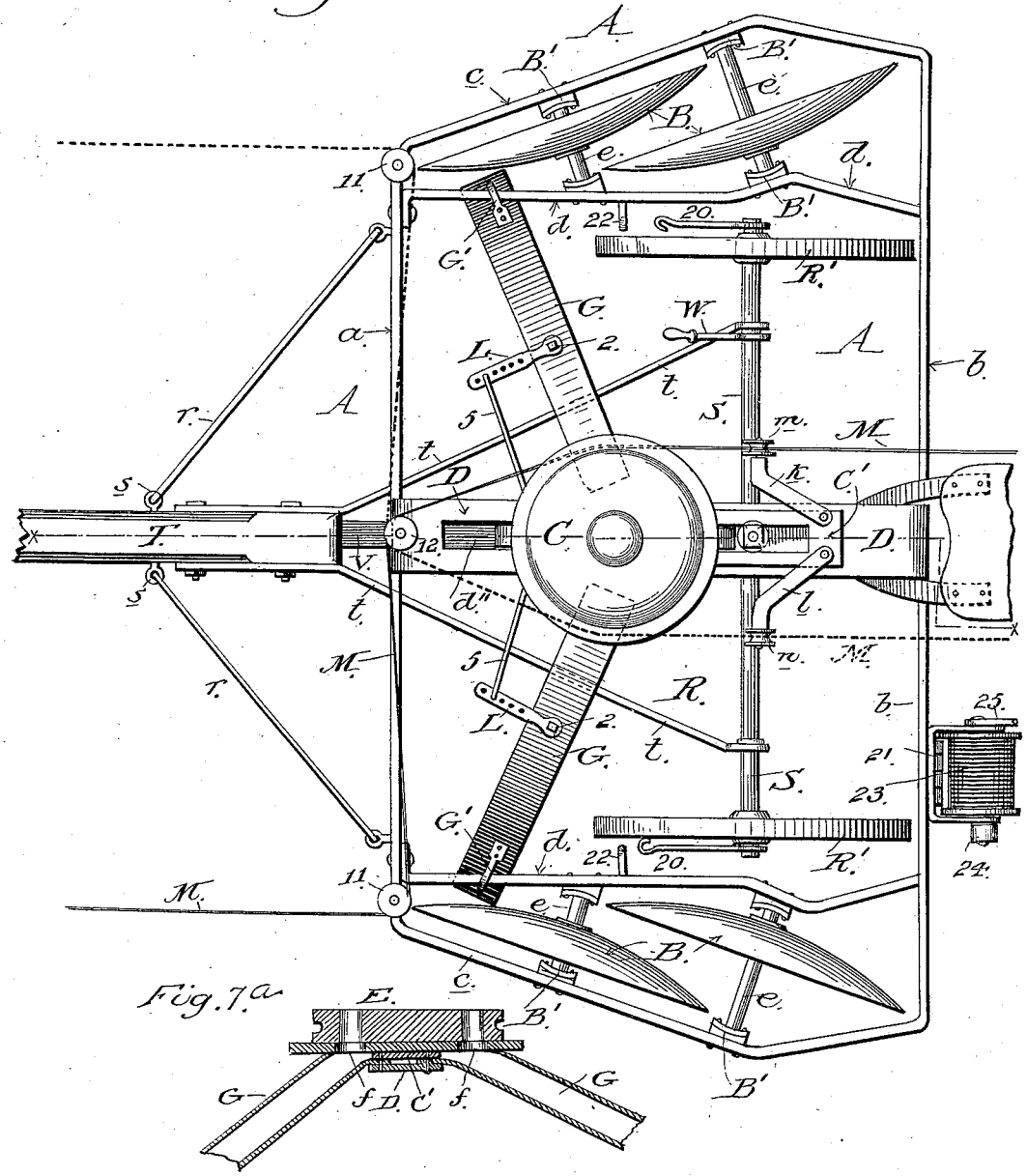
Figure 2:
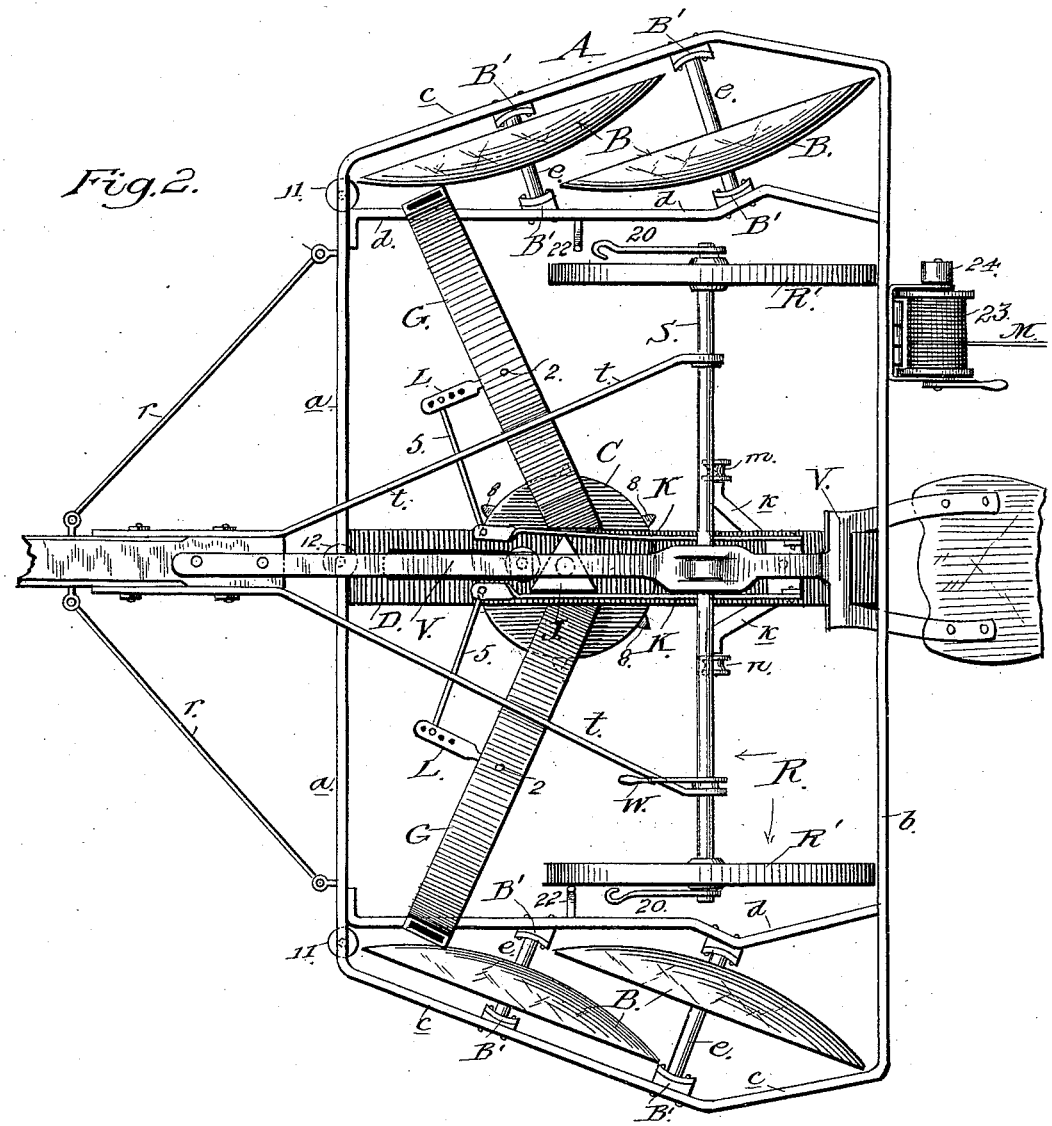
Figure 7:
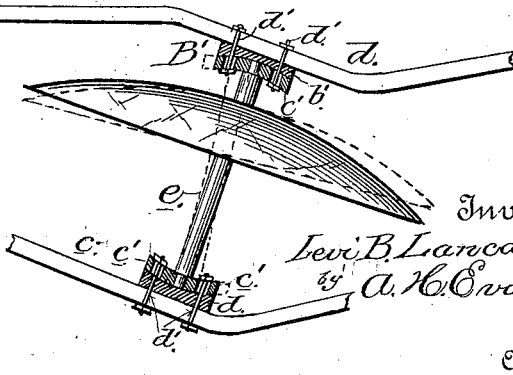

Figure 1 is a top plan view of my improved machine. Fig. 2 is a bottom view of the same. Fig. 3 is a longitudinal sectional view on the line $x\ x$ of Fig. 1. Fig. 4 is an enlarged detail of one of the valved discharge-spouts, showing the top of the casing broken away. Fig. 5 is a detail of the perforated distributer-plate. Fig. 6 is a detail of the reel for taking up and paying out of the check-row wire. Fig. 7 is detail representing one of the adjustable boxes or bearings for the shafts of the disks. Fig. 7$^a$ is a detail to be referred to.

My invention relates to the class of inventions known as "seeders" and "planters," and particularly to that class denominated "corn-planters;" and my invention consists in the construction and combination of devices which I shall hereinafter describe and claim.

To enable others skilled in the art to which my invention appertains to make and use the same, I will now describe its construction and indicate the manner in which the same is carried out.

In the said drawings, A represents a main frame consisting, preferably, of front and rear bars $a$ and $b$, respectively, and side bars $c$, which diverge rearwardly from the front bar $a$ to a point back of the center of the frame, and thence extend in converging lines to said rear bar $b$, as shown, other bars $d$, extending from the front to the rear bars, being located inside of the sides of the main frame and serving, with the side bars $c$ of said frame, as bearings for the shafts or axles $e$ of the disks B. These disks B have their shafts or axles inclined rearwardly, and they are preferably arranged in pairs on opposite sides of the machine, one disk being behind the other and to one side thereof, so that they may properly operate upon the soil and cover the seed or grain after it has been deposited in the ground. The shafts or axles $e$ of the disks are mounted in adjustable boxes B', secured to the main frame, and consisting, essentially, of blocks $b'$, bolted to the bars $c$ and $d$ and having concave faces adapted to form seats for the concavo-convex boxes $c'$, which are slotted upon bolts $d'$ and receive the ends of the shafts or axles, whereby when said bolts $d'$ are loosened and the boxes moved toward the front or rear the shafts or axles are correspondingly inclined to suit the condition of the ground.

The advantages of these disks for opening the ground are numerous and far superior to those machines employing a "shoe" for the same purpose. In opening the ground with a shoe the earth is pressed back upon each side thereof, leaving two walls that are practically plastered by the scouring process of the shoe pressing the ground apart. When the seed is deposited between these plastered walls and the follower or roller is passed over the ground to close the crevice made by the shoe, it is difficult for the tender roots of the kernels to work their way through the hard or plastered walls before mentioned. In additon to this on rolling ground after the seed is deposited, if the ground is not harrowed or brushed before a rain-fall, the water will find its way into the crevice between the hard walls and dissolve or soften the dirt and float off the grain or seed, thereby exposing the same to the injurious effects of the sun, as well as to birds and animals. By the employment of my inclined disks these objectionable features are done away with, as the disks pulverize the ground and throw the dirt in a fresh and mellow condition onto the corn. My disks also place the hills in the center of the strip being cultivated, thereby giving the grain the advantage of the weeds and permitting the farmer to cultivate the balance of the ground without crowding too near the growing plants.

The hopper C for the grain is supported centrally upon the machine upon a bar D, that extends from the bars $a$ and $b$, and said bar D is slotted longitudinally at $d''$ and raised somewhat above the top surface of the main frame, and said hopper has a rearwardly-extending slotted plate C', which is engaged by a set-nut or equivalent device to adjustably secure the hopper in position on the bar D. The bottom of the hopper is slotted to permit the discharge of grain therefrom, and in said bottom and the bar D is mounted a short vertical shaft or axis $e'$ for the perforated distributer-disk E, which lies just beneath the bottom of the hopper and between the same and a plate F, which rests upon the bar D, the said plate F being provided with discharge-openings $f$, (see Fig. 7$^a$,) which communicate with the upper ends of the forwardly-extending downwardly-inclined spouts G, one of which leads toward each side of the machine and has its lower end close to the ground and adapted to discharge the grain into the furrows formed by the disks. These spouts G are provided with hook-shaped lugs G' or similar devices adapted to pass over the side bars of the main frame to support the lower ends of the spouts, and each of said spouts has pivotally secured at 2 between the inner side walls thereof a valve or plate H, which extends diagonally across the spout, as shown in Fig. 4, while the lower end of said valve or plate is forked at $h$ and adapted to receive the upper end of a valve or plate I, also extending diagonally across the chamber of the spout, but in a reverse direction to the valve or plate I', and pivotally secured between the walls of the spout, as shown. The shaft or axis $e$ carries at its lower end a cam J of triangular form, and to a slotted plate 3, adjustably secured to the bottom of the bar D, the rear ends of suitable spring-arms K are secured, said arms extending forward parallel with each other and upon opposite sides of the cam J and having their forward ends free, so that when the cam is rotated by means hereinafter described the arms are alternately forced apart and allowed to spring inwardly. The free ends of the arms K are loosely connected with the inner ends of links or rods 5, whose outer ends are adjustably secured to arms L, fixed to the axes 2 of the valves or plates H. From this description and the illustration of the same as shown, it will be seen that when the distributer-disk is rotated the cam permits the spring-arm K to move inward, drawing upon the link or rods 5 and moving the valves or plates H and I from the full-line position in Fig. 4 to the dotted position and causing the grain at the point 6 to enter the furrows, while the grain at the fork of the plate or valve H drops into the lower part of the spout to the point 7 and is held therein until the cam again operates to change the position of the valves or plates.

The mechanisms previously described for dropping two charges of grain from a single hopper and at one operation are important, both as to the saving of machinery and the durability of the machine, while the machine described and shown contains but few pieces and joints and dispenses with the complicated and expensive check-row attachments now in use, as my machine combines in a simple and positive manner the joint features of a planting and check-row machine.

To better disclose the check-row feature of my machine, I call attention to the fact that the distributer-disk has forked projections 8 formed or secured directly on its periphery, one for each of the perforations or apertures in the distributer-plate. Pivotally secured to the extension-plate C' of the hopper are two arms $k\,l$, whose outer free ends carry grooved pulleys $m\,n$ for guiding the check-row wire M to the forks 8 of the distributer-plate, while at the front corners of the main frame are mounted other grooved rollers 11, which, together with a similar roller 12 at the center of the front part of the machine, serve to guide the check-row wire. From this description it will be seen that the buttons on the check-row wire operate directly upon the distributer-plate, causing it to revolve and start in motion the heavier machinery which operates with it by the passage of the buttons.

The spouts G may have their upper ends secured between plates D and C', and as their lower ends are loosely suspended and the hopper is capable of movement back and forth on its slotted supporting-plate, it is evident that I may regulate the discharge of grain to correspond to the "gait" of the team. In other words, if the grain is found to be dropping too soon to bring it in check, I move the conducting-spouts ahead, and if the discharge is not soon enough I move them rearwardly; or, if desired, I can accomplish the same results by moving the hopper in one direction and the spouts in the other.

The manner of connecting the wire with the machine is as follows: Suppose the planter to have entered the field at the southeast corner thereof and the operator wishes to plant east and west, it would be necessary to drive from the east to the west before beginning to plant in order to properly "lay" the wire. Upon arriving at the west side of the field the machine is turned around and placed in position to plant the first rows. The distributer-plate is now revolved by hand to cast two hills into the conducting-spouts, when the team is started and the operation of planting begins, the wire having been first placed around the pulleys 12 and $m$ and passed to the anchor-pin in the ground, the usual buttons on the wire being adapted to engage the forks on the distributer-plate to operate said plate positively, as before described. This position of the wire remains until the team reaches the east side of the field, when the machine is turned around to the left one-quarter of a turn, when sufficient slack will be provided to change the wire to the dotted position in Fig. 1—in other words, to the pulleys 11, 12, and $n$—then complete the turning of the machine and start the planting in the next two rows. This manner of changing the position of the check-wire is simple and readily accomplished.

The machine described is connected with a wheeled frame R, located between the sides of the main frame by means of loosely-connected rods $r$, which extend forward from the front bar of the frame A and are adapted to hook into eyes $s$ upon the sides of the tongue T of the wheeled frame, the said tongue being joined to the axle or shaft S of the wheel-frame by means of rearwardly-extending curved bars $t$, while from the under side of the tongue extends a bar V, which is fitted to the axle S, and thence extends upwardly back of the same and is adapted to extend up on each side of the central bar D and serve as a support for the operator's seat, as shown. This loose connection of the tongue with the main frame forms a "limber" connection and greatly relieves the team of the weight of the machine and of the usually heavy tongue or pole.

To raise the machine out of the ground I employ arms 20, secured rigidly to the outer ends of the axle S and adapted to be brought into contact with suitable lugs or stops 22 on the inner sides and near the center of the bars $d$ of the main frame, the said shaft having also rigidly secured to it a lever W, which when moved rearward causes the arms V to ride up under the lugs or stops 22 and raise the frame, so that the disks may be raised out of the ground, or may be adjusted to regulate the distance they shall enter the ground. The lever may be held by any well-known form of pawl-and-ratchet mechanism, (not shown,) and when moved forward again causes the arms 20 to become disengaged from the lugs or stops 22 and permits the frame and disks to be lowered.

In connection with the machine described I employ a reel for the check-row wire and mount the same by a pivot or hinge connection 21 with the rear bar $b$ of the main frame. This reel consists of a drum 23, upon which the wire is wound, and on the shaft or axis of the drum is a friction-pulley 24, which, when the reel is in the position shown in Fig. 6, is adapted to rest upon the rim of one of the main bearing or ground wheels R' of the wheeled frame R. By thus mounting the reel the movement of the wheel R' is transmitted directly to the friction-pulley and thence to the drum to cause the latter to wind up the wire. Thus as the machine moves forward the reel is rotated in a reverse direction to take up the wire, as, should the movement of the reel be relatively faster than that of the machine, the tension of the wire will cause the friction-pulley to slip upon the face or rim of the wheel R', thereby removing the strain from the wire. The shaft of the drum 23 also carries a lever 25, by means of which the reel may be shifted from the position in Fig. 6, where it is shown as taking up the wire, to the position shown in Fig. 1, where the reel is paying out the wire, the friction-pulley in this latter case being away from and out of engagement with the wheel R'.

This reel is simple in its construction, and is readily applied to other forms of planters where a ground-wheel is used.

Having thus described my invention, what I claim as new, and desire to secure by Letters Patent, is—

1. The combination of a centrally-disposed hopper, inclined spouts communicating therewith and leading from opposite sides thereof, and revolving disks mounted on inclined axes, one behind the other, and adapted to open and cover the ground, substantially as herein described.

2. In a planter, the combination, with the check-row wire, of a hopper adjustably secured so that it may be moved back and forth, a distributer-disk within said hopper, and spouts leading from the hopper, said spouts being capable of movement back and forth, substantially as herein described.

3. The combination, with the main frame, of a hopper mounted centrally thereon, a seed-distributing disk within the hopper having its periphery formed or provided with forked lugs for the check-wire, a cam on the shaft of the disk, spring-arms upon each side of the cam having their forward ends free, spouts leading from the hopper toward each side of the machine and having valves or pivoted plates, and arms fixed to the axis of the upper valves and having their outer ends connected with the free ends of the spring-arms, whereby said valves are operated, substantially as herein described.

4. In a planter, a centrally-disposed hopper having a distributer-disk, spouts leading therefrom toward each side of the machine, oppositely-inclined pivoted valves or plates within the spouts, a cam on the axis of the distributer-disk, and connections therefrom to the valves in the spouts for operating the latter, substantially as herein described.

5. In a planter, a main frame and complementary seed-distributing mechanism, in combination with a wheeled frame within the sides of the main frame, a tongue and seat support carried by the wheeled frame, and rods flexibly connected with the tongue and front of the main frame, whereby a limber connection is made, substantially as herein described.

6. In a planter, the main frame, the disks, and the shafts or axis of the same, in combination with blocks $b'$, secured to said frame and having concave faces, and the concavo-convex boxes $c'$, having bearings for the shafts and slotted upon the bolts which secure the blocks $b'$ in position, whereby said boxes are adjusted, substantially as herein described.

7. In a planter, the main frame thereof, in combination with means for raising and lowering the same, consisting of a shaft S within the main frame, a lever W, fixed to said shaft, and arms 20, rigid on the outer ends of the shaft and adapted to be brought into contact with lugs or stops 22 on the inner sides of the main frame, whereby the main frame is elevated, substantially as herein described.

LEVI BENJAMIN LANCASTER.

Witnesses:
  G. H. WOFREE,
  H. J. BROCKMAN.